(12) United States Patent
Choe et al.

(10) Patent No.: US 10,949,934 B2
(45) Date of Patent: Mar. 16, 2021

(54) METHOD, SYSTEM, USER TERMINAL AND APPARATUS FOR POWER MANAGEMENT

(71) Applicant: Encored Technologies, Inc., Seoul (KR)

(72) Inventors: Jong-Woong Choe, Seoul (KR); Dae Young Kim, Seoul (KR)

(73) Assignee: Encored Technologies, Inc., Seoul (KR)

( * ) Notice: Subject to any disclaimer, the term of this patent is extended or adjusted under 35 U.S.C. 154(b) by 474 days.

(21) Appl. No.: 14/862,192

(22) Filed: Sep. 23, 2015

(65) Prior Publication Data
US 2016/0356830 A1 Dec. 8, 2016

(30) Foreign Application Priority Data

Jun. 5, 2015 (KR) .......................... 10-2015-0080223

(51) Int. Cl.
| | |
|---|---|
| *G01R 21/133* | (2006.01) |
| *G06Q 50/06* | (2012.01) |
| *G06Q 20/14* | (2012.01) |
| *G01R 22/10* | (2006.01) |

(52) U.S. Cl.
CPC ........... *G06Q 50/06* (2013.01); *G01R 21/133* (2013.01); *G06Q 20/145* (2013.01); *G01R 22/10* (2013.01)

(58) Field of Classification Search
CPC .............................. G01R 22/063; G01R 22/10

USPC ......................................... 702/62, 57, 60, 61
See application file for complete search history.

(56) References Cited

U.S. PATENT DOCUMENTS

| | | | |
|---|---|---|---|
| 2012/0096291 A1* | 4/2012 | Guang | ...................... G06F 1/26 713/321 |
| 2016/0041573 A1* | 2/2016 | Chen | ........................ G05F 1/66 700/295 |
| 2017/0146969 A1* | 5/2017 | Yamada | ............. G05B 19/0426 |
| 2017/0343973 A1* | 11/2017 | Kitaji | .................... G05B 19/042 |

FOREIGN PATENT DOCUMENTS

| | | |
|---|---|---|
| JP | 2013131148 A | 7/2013 |
| JP | 2013243555 A | 12/2013 |
| JP | 2014120787 A | 6/2014 |
| JP | 6229884 B | 11/2017 |

\* cited by examiner

*Primary Examiner* — Alfredo Bermudez Lozada
(74) *Attorney, Agent, or Firm* — Quantum Patent Law Firm; Seongyoune Kang

(57) ABSTRACT

A power managing method includes receiving a scan command for a load apparatus connected to a multi-tap type energy measuring apparatus. Further, the power managing method includes determining a power consumption pattern of the load apparatus for a predetermined time based on a signal corresponding to the scan command from the user terminal. Further, the power managing method includes receiving information of the load apparatus. Further, the power managing method includes registering the load apparatus based on the determined power consumption pattern and the information of the load apparatus received from the user terminal.

11 Claims, 13 Drawing Sheets

(a)              (b)

METHOD, SYSTEM, USER TERMINAL AND APPARATUS FOR POWER MANAGEMENT

CROSS-REFERENCE TO RELATED APPLICATIONS

This present disclosure claims priority to Korean Patent Application No. 10-2015-0080223, filed Jun. 5, 2015 and the entire contents of which are incorporated herein by reference.

TECHNICAL FIELD

The present invention relates to power management systems, and more particularly to mechanism to register a load apparatus in a power managing server to manage power usage by the registered load apparatus.

BACKGROUND

Prior art that acquires power usage information of individual load apparatuses for power management has been developed. Typically, such prior arts provide either a hardware access method or a software access method.

In the hardware access method, energy usage information of the individual load apparatuses is extracted by installing multiple individual energy measuring apparatuses or by using multiple sensors in a distribution board. This has disadvantages in terms of hardware cost, installation space, installation time, resources and involved thereof.

In order to overcome the disadvantages, a software access method is devised, which efficiently extracts the energy usage information of the individual load apparatuses through cooperation of a single measuring apparatus and a server at a power penetration point. That is, the energy usage information of the individual load apparatuses is intended to be extracted from total energy usage information in such a manner that the single measuring apparatus collects various data including current, voltage, power, or the like. The server analyzes and collects related data. However, since the load apparatus has various features for each product (for example, an energy usage feature of a refrigerator of a specific maker also varies depending on a release year and existence of a water purifier), energy usage data of various individual load apparatuses need to be still continuously acquired for commercialization of a related product or service.

SUMMARY OF INVENTION

Accordingly the embodiments herein disclose a system for power management. The systems includes a multi-tap type energy measuring apparatus, connected to at least one load apparatus, configured to measure energy usage information of the at least one load apparatus. Further, the system includes a user terminal configured to receive a scan command and information of the at least one load apparatus. Further, the system includes a power managing server configured to determine a power consumption pattern of the at least one load apparatus for a predetermined time in response to receiving the scan command and register the at least one load apparatus based on the determined power consumption pattern and the information of the at least one load apparatus.

Accordingly the embodiments herein disclose a user terminal for power management. The user terminal includes a control unit comprising a power management application. Further, the user terminal includes an input unit configured to receive a scan command and information of at least one load apparatus connected to a multi-tap type energy measuring apparatus using the power management application. Further, the user terminal includes a communication unit configured to transmit signals corresponding to the scan command and the information of the load apparatus to a power managing server. Further, the user terminal includes an output unit configured to display the power management application. The control unit controls an operation of the input unit, the communication unit, and the output unit. The load apparatus is registered in the power managing server based on a power consumption pattern for a predetermined time in response to receiving the scan command and information of the at least one load apparatus.

Accordingly the embodiments herein disclose a power managing method. The power managing method includes receiving, by a user terminal, a scan command for a load apparatus connected to a multi-tap type energy measuring apparatus. Further, the power managing method includes determining, by a power managing server, a power consumption pattern of the load apparatus for a predetermined time based on a signal corresponding to the scan command from the user terminal. Further, the power managing method includes receiving, by the user terminal, information of the load apparatus. Further, the power managing method includes registering, by the power managing server, the load apparatus based on the determined power consumption pattern and the information of the load apparatus received from the user terminal.

Accordingly the embodiments herein disclose a multi-tap type energy measuring apparatus. The multi-tap type energy measuring apparatus includes a power information collecting unit configured to collect power information including a power signal at at least one power penetration point for a plurality of load apparatuses. Further, the multi-tap type energy measuring apparatus includes an operating state extracting unit configured to extract one of an operating state and a change pattern of the operating state of the load apparatus by distinguishing between a normal state and an excessive state of a power change from the collected power information. Further, the multi-tap type energy measuring apparatus includes a data set generating unit configured to generate a data set for each of the individual load apparatuses, which matches one of the operating state and the change pattern of the operating state through a signal correlation, wherein the signal correlation depends on power consumption characteristics of each load apparatuses.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

Figure 1:
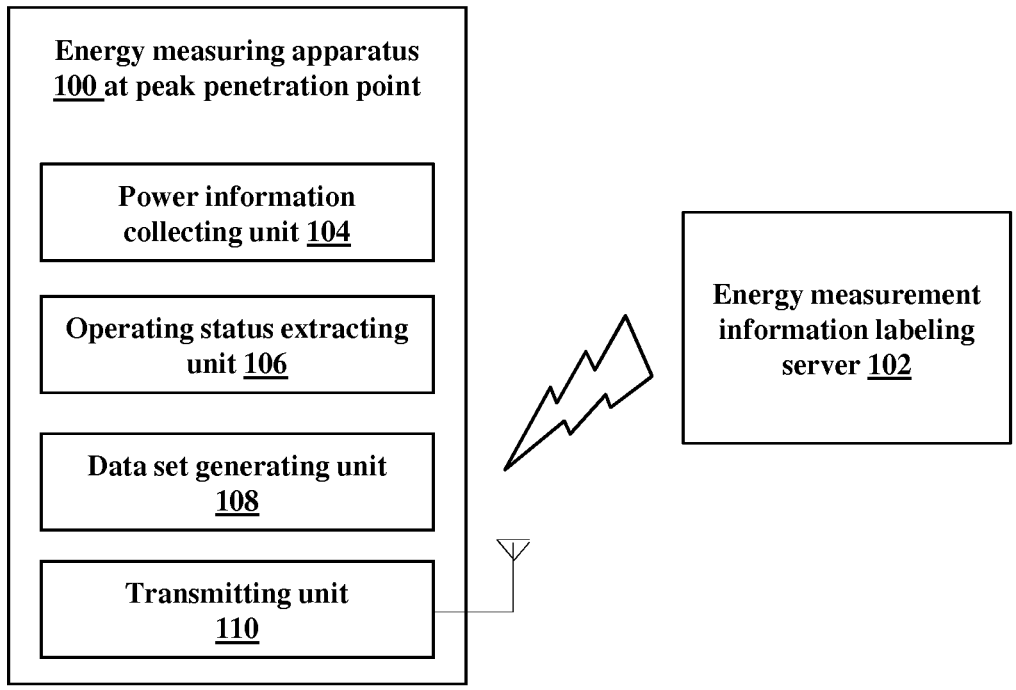
FIG. 1 is a block diagram illustrating an energy measuring apparatus at a power penetration point, according to the embodiments as described herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Accordingly the embodiments herein disclose a system for power management. The systems includes a multi-tap type energy measuring apparatus, connected to at least one load apparatus, configured to measure energy usage information of the at least one load apparatus. Further, the system includes a user terminal configured to receive a scan command and information of the at least one load apparatus. Further, the system includes a power managing server configured to determine a power consumption pattern of the at least one load apparatus for a predetermined time in response to receiving the scan command and register the at least one load apparatus based on the determined power consumption pattern and the information of the at least one load apparatus.

Accordingly the embodiments herein disclose a user terminal for power management. The user terminal includes a control unit comprising a power management application. Further, the user terminal includes an input unit configured to receive a scan command and information of at least one load apparatus connected to a multi-tap type energy measuring apparatus using the power management application. Further, the user terminal includes a communication unit configured to transmit signals corresponding to the scan command and the information of the load apparatus to a power managing server. Further, the user terminal includes an output unit configured to display the power management application. The control unit controls an operation of the input unit, the communication unit, and the output unit. The load apparatus is registered in the power managing server based on a power consumption pattern for a predetermined time in response to receiving the scan command and information of the at least one load apparatus.

Accordingly the embodiments herein disclose a power managing method. The power managing method includes receiving, by a user terminal, a scan command for a load apparatus connected to a multi-tap type energy measuring apparatus. Further, the power managing method includes determining, by a power managing server, a power consumption pattern of the load apparatus for a predetermined time based on a signal corresponding to the scan command from the user terminal. Further, the power managing method includes receiving, by the user terminal, information of the load apparatus. Further, the power managing method includes registering, by the power managing server, the load apparatus based on the determined power consumption pattern and the information of the load apparatus received from the user terminal.

Accordingly the embodiments herein disclose a multi-tap type energy measuring apparatus. The multi-tap type energy measuring apparatus includes a power information collecting unit configured to collect power information including a power signal at at least one power penetration point for a plurality of load apparatuses. Further, the multi-tap type energy measuring apparatus includes an operating state extracting unit configured to extract one of an operating state and a change pattern of the operating state of the load apparatus by distinguishing between a normal state and an excessive state of a power change from the collected power information. Further, the multi-tap type energy measuring apparatus includes a data set generating unit configured to generate a data set for each of the individual load apparatuses, which matches one of the operating state and the change pattern of the operating state through a signal correlation, wherein the signal correlation depends on power consumption characteristics of each load apparatuses.

Unlike the conventional systems and methods, a multi-tab type energy measuring apparatus is provided which can be movably installed without a place limit. A load apparatus used by a user is registered in a power managing server by using a power managing application installed in a user terminal. The proposed system and method can be used to accurately determine a power usage state for each load apparatus by registering power consumption pattern and apparatus information at the time of registering the load apparatus in the power managing server. Further, the proposed system and method can be implemented using existing infrastructure and may not require extensive setup and instrumentation.

Referring now to the drawings and more particularly to FIGS. 1 to 10b where similar reference characters denote corresponding features consistently throughout the figures, there are shown preferred embodiments.

FIG. 1 is a block diagram illustrating an energy measuring apparatus 100 at a power penetration point, according to an embodiment as disclosed herein. In the embodiment, the energy measuring apparatus 100 can be configured to generate an unregistered load clustering data set in order to individually estimate energy consumption information of each load apparatus connected to the power penetration point and transmits the estimated energy consumption information to an energy measurement information labeling server 102.

The energy measuring apparatus 100 described herein is installed together with a single sensor at the power penetration point. The energy measuring apparatus 100 performs a series of operations to measure total electric energy consumption and estimate energy consumption of each load apparatus. Unlike the conventional systems and methods, a previous information processing process performed for each load apparatus is summarized below.

First, a snapshot is extracted from a signal of voltage or current. Noise filtering is performed by extracting a reference point. Normal or excessive statuses of the voltage, active power, reactive power, or the like are distinguished based on a corresponding result, and operating statuses. An operating status change such as an "ON" or "OFF" event of the individual load apparatuses are extracted through the distinguished normal or excessive statuses. In addition, a final clustering data set is generated by pattern matching load classification through a voltage-current correlation, a high-frequency distortion, a current or power snapshot signal deformation, an active or reactive power correlation, or the like associated with a load feature. Further, the generated clustering data set is transmitted to the energy measurement information labeling server 102 or cloud through data compression in an unregistered status. For example, load classification mark such as 1, 2, 3 or A, B, C, or the like may not be a registered status and may not be recognized to a user.

The energy measuring apparatus 100 can include a power information collecting unit 104, an operating status extracting unit 106, a data set generating unit 108, and a transmitting unit 110.

In an embodiment, the power information collecting unit 104 can be configured to collect energy or power information including a power signal at the power penetration point for a plurality of load apparatuses. The load apparatus described herein can include energy using apparatuses or components using electric energy. In an embodiment, the load apparatus can include both the individual energy apparatus such as television, refrigerator, or the like and the component unit such as motor, light, or the like. The power penetration point can be, for example, a node into which power penetrates with respect to the plurality of load apparatuses such as the power penetration point of a panel board or a distribution board of a household. Further, the various operations performed by the power information collecting unit 104 are described in detail in conjunction with the FIG. 2A.

In an embodiment, the operating status extracting unit 106 can be configured to distinguish between a normal or excessive status of a power change from the collected voltage or power information to extract an operating status or a change pattern of the operating status of the load apparatus. Further, the various operations performed by the operating status extracting unit 106 are described in detail in conjunction with the FIG. 2B.

In an embodiment, the data set generating unit 108 can be configured to generate a data set for each of the individual load apparatuses which matches the operating status or the change pattern of the operating status through a signal correlation depending on power usage information of the individual load apparatuses. The various operations performed by the data set generating unit 108 are described in detail in conjunction with the FIG. 2C.

When the data sets are generated, the transmitting unit 110 can be configured to transmit the generated data sets to the energy measurement information labeling server 102 that generates labeled power information by recombining the data sets.

The FIG. 1 illustrates a limited overview of the energy measuring apparatus 100 but, it is to be understood that other embodiments are not limited thereto. The labels provided to each unit or component is only for illustrative purpose and does not limit the scope of the invention. Further, the one or more units can be combined or separated to perform the similar or substantially similar functionalities without departing from the scope of the invention. Furthermore, the energy measuring apparatus 100 can include various other components interacting locally or remotely along with other hardware or software components to measure energy usage information of a plurality of load apparatus connected to a power penetration point.

Figure 2A:
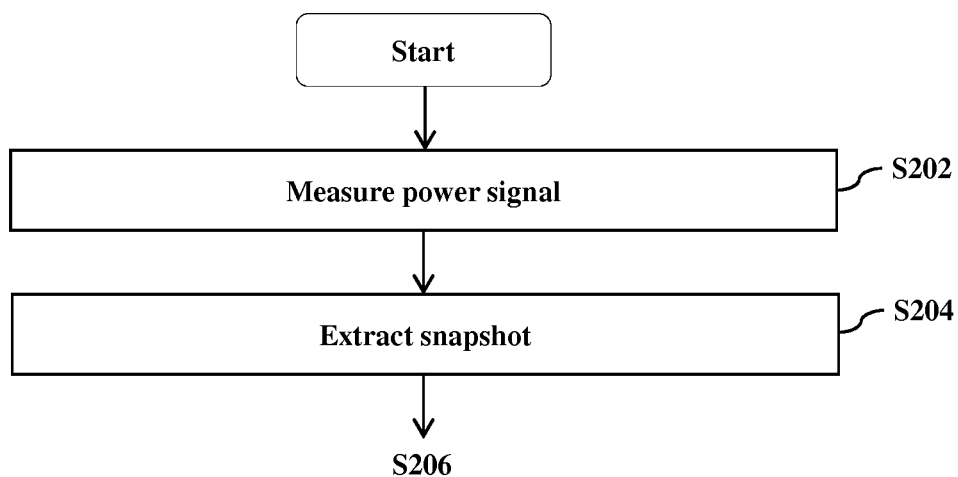
FIGS. 2a, 2b, and 2c are flowcharts illustrating various operations performed by the energy measuring apparatus at a power penetration point, according to the embodiments as described herein.

FIG. 2A is a flowchart illustrating various operations performed by the power information collecting unit 104 of the energy measuring apparatus 100 at a power penetration point, according to the embodiments as described herein. In the embodiment, the power information collecting unit 104 can be configured to measure a power signal (Step S202). Unprocessed power information waveforms of the current and the voltage are measured through the energy measuring apparatus 100 installed at the power penetration point and the single sensor.

Further, the power information collecting unit 104 can be configured to extract snapshot (Step S204). A voltage or current snapshot of an AC waveform having a predetermined cycle is collected. In the embodiment, snapshots of voltage having one AC cycle waveform and high-frequency current are preferably extracted.

Figure 2B:
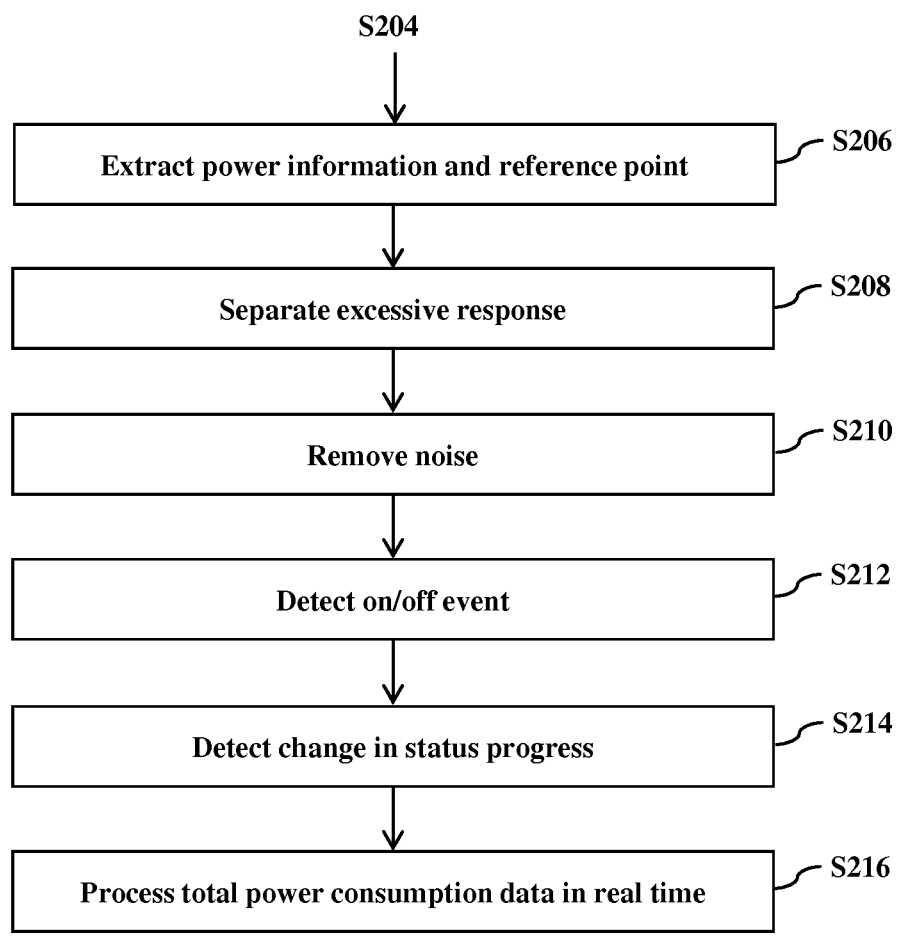

FIG. 2B is a flowchart illustrating various operations performed by the operating status extracting unit 106 of the energy measuring apparatus 100 at a power penetration point, according to the embodiments as described herein. The operating status extracting unit 106 can be configured to distinguish between a normal or excessive status of a power change from the collected voltage or power information to extract an operating status or a change pattern of the operating status of the load apparatus.

Referring to the FIG. 2B, the operating status extracting unit 106 can be configured to extract power information and reference point (Step S206). In an embodiment, real-time power consumption and power quality information are extracted, and the reference point for distinguishing the normal or excessive status is extracted.

In the embodiment, the reference point is preferably power consumption which is constantly used without fluctuation while being not turned on or off and continuously turned on in each of the load apparatuses through the extraction of the real-time power consumption and power quality information.

Further, the operating status extracting unit 106 can be configured to separate an excessive response (Step S208). In an embodiment, an excessive status interval is extracted, in which turn-on or off is performed or the operating status is changed by operations of the individual load apparatuses in the power consumption.

Furthermore, in an embodiment, the operating status extracting unit 106 can be configured to remove a noise (Step S210). A meaningless high-frequency noise signal generated in power signal measurement of total power consumption is removed.

Furthermore, the operating status extracting unit 106 can be configured to classify the snapshot according to the extracted operating status or change pattern of the operating status. For example, in the case of being determined as the excessive response operation, the snapshot may have an even higher snapshot extraction frequency than the normal status.

Furthermore, the operating status extracting unit 106 can be configured to detect an "ON" or "OFF" event (Step S212). In an embodiment, the snapshots for events are classified for each "ON" or "OFF" status before clustering each of the individual load apparatuses through detection of the "ON" or "OFF" event. The operating status extracting unit 106 can be configured to detect status change (Step S214). Multi-steps other than the "ON" or "OFF" operation are provided. The change patterns of the operating statuses of loads which have a continuous change characteristic are detected and classified.

After detecting the status change, the operating status extracting unit 106 can be configured to process real-time total power consumption data (Step S216). In an embodiment, the power information data is operated and stored, and a transmission data packet is generated with respect to total energy consumption and the power quality information for a real-time power consumption service.

Figure 2C:
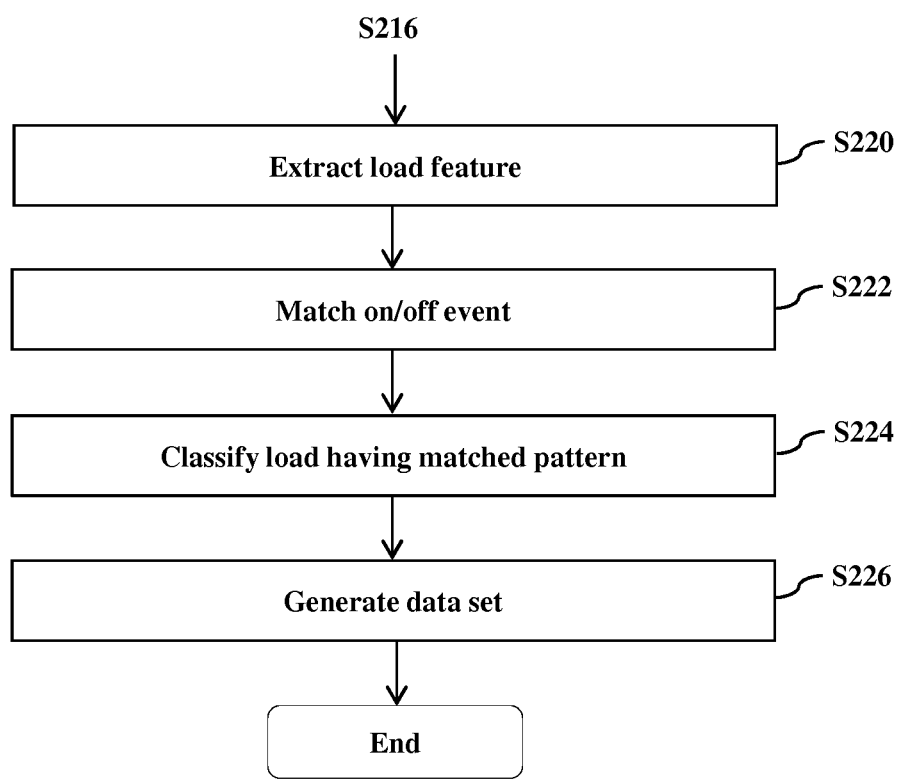

FIG. 2C is a flowchart illustrating various operations performed by the data set generating unit 108 of the energy measuring apparatus 100 at a power penetration point, according to the embodiments as described herein. The data set generating unit 108 can be configured to generate a data set for each of the individual load apparatuses which matches the operating status or the change pattern of the operating status through a signal correlation depending on power usage information of the individual load apparatuses.

Referring to the FIG. 2C, the data set generating unit 108 extracts load features (Step S220). In the embodiment, a signal correlation on which the power usage features of the individual load apparatuses are reflected is generated by using the snapshot, the excessive response, the "ON" or "OFF" event, and the status change information extracted from the total power consumption data. The signal correlation can include the voltage or current correlation, the high-frequency distortion, the current or power signal deformation, the active or reactive power correlation, or the like.

Further, the data set generating unit 108 can be configured to match the "ON" or "OFF" event (Step S222) and classify pattern matching load (Step S224) to generate the data set. The "ON" or "OFF" operation events for the individual load apparatuses are classified in a pair of the same load apparatuses based on the generated signal correlation. The multi-steps or continuous change characteristics are classified into an association group with the "ON" or "OFF" operation events with respect to the same load apparatus based on the generated signal correlation.

Furthermore, the data set generating unit 108 can be configured to generate a data set (Step S226). The data sets collected by the association group are generated through the "ON" or "OFF" event matching and the pattern matching load classification.

When the data sets are generated, the transmitting unit 110 can be configured to transmit the generated data sets to the energy measurement information labeling server 102 that generates labeled power information by recombining the data sets.

Prior to the transmission, in the embodiment, the data packet generated by the energy measuring apparatus 100 is compressed to facilitate transmission of the massive data to the energy measurement information labeling server 102.

Further, the power consumption and the quality information data required to perform a real-time power energy information service can be together transmitted.

Further, referring to the FIGS. 8a to 8c, a snapshot extraction (that is, power signal sampling) period and the resulting information processing efficiency of the present invention will be described in detail.

In an embodiment, it is important for the power information collecting unit 104 to appropriately select the snapshot extraction period. When a snapshot extraction frequency is lower than a specific value, for example, when the snapshot extraction frequency is less than one per second, a resolution for an excessive state interval of the load apparatus is low. As a result, it is difficult to distinguish different individual load apparatuses and when the snapshot extraction period is higher than a specific value. For example, when the snapshot extraction period is higher than thousand to ten thousand times per second, the resolution for the excessive state interval is excessively high. As a result, an error may occur, such as recognizing the same load apparatuses as different load apparatuses. Therefore, the snapshot extraction period for efficient prior information processing of the energy measuring apparatus 100 at the penetration point of power is appropriately 10 to 300 times per second.

Further, information processing after extracting the operating state may be efficient through the snapshot classification of the operating status extracting unit 106 (e.g., a method in which, in the snapshot extraction step (S204), the snapshot is continuously extracted at 15 times per second. But when there is no change in operating status, only one snapshot among 15 snapshots or 15 representative values are selected and classified. When the change in operating status is sensed, all of the 15 snapshots are selected to separately increase only the resolution of the excessive state interval). That is, by a method in which while the resolution of the excessive state interval (which is required for the energy usage information analysis) for each apparatus increases, a data traffic related burden decreases (e.g., even in the case where the transmitting unit 110 periodically transmits data once per second, when there is no change in operating status, only one snapshot which is selected and classified or only one representative value calculated through mensuration of division is transmitted and during the excessive state interval, 15 snapshots are transmitted at once), matching between an energy measuring apparatus 100 and the server is improved. As a result, the "ON" or "OFF" event detecting step (S212), the status change detecting step (S214), and some or all the steps performed by the data set generating unit 108 may be performed through the server.

Figure 3:
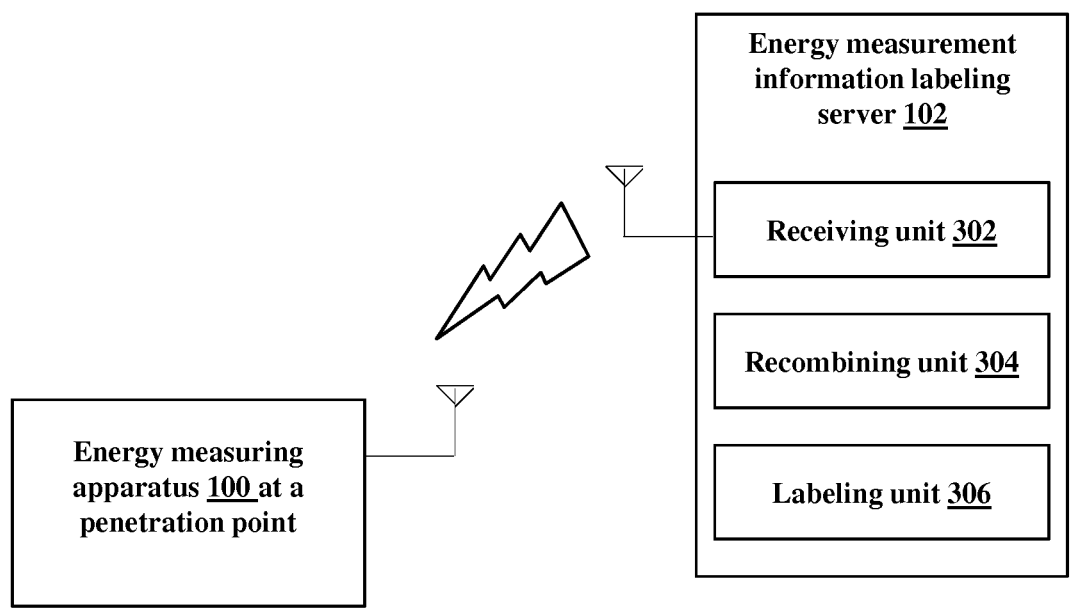
FIG. 3 is a block diagram illustrating an energy measurement information labeling server, according to the embodiments as described herein.

The details of the energy measurement information labeling server 102 that generates the labeled power information by receiving the data sets generated by the power penetration point energy measuring apparatus 100 are described in conjunction with the FIG. 3.

Figure 8:
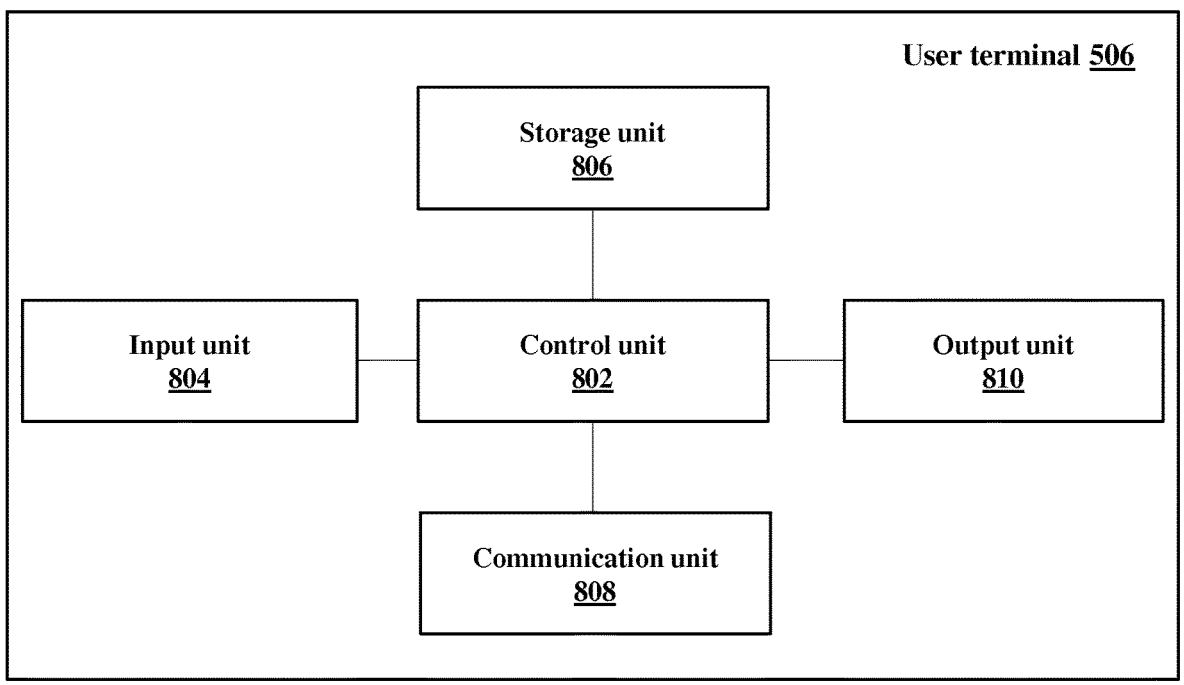
FIG. 8 is a block diagram of a user terminal for power management, according to the embodiments as described herein.

The various actions, acts, blocks, steps, or the like of the FIGS. 8 and 10 may be performed in the order presented, in a different order or simultaneously. Further, in some embodiments, some of the actions, acts, blocks, steps, or the like may be omitted, added, modified, skipped, or the like without departing from scope of the invention.

The FIG. 3 is a block diagram illustrating the energy measurement information labeling server 102, according to the embodiments as described herein. In an embodiment, the energy measurement information labeling server 102 can be configured to process the energy usage information and saving tip consulting for a power user at the power penetration point through processes such as machine running and automatic labeling based on the received clustering data set and real-time power consumption, and power quality information data set. The energy measurement information labeling server 102 may be a mass data processing device that processes the total energy information and energy information for each of the individual load apparatuses to generate various energy saving solutions.

In an embodiment, the energy measurement information labeling server 102 can be configured to process specific post information through the various computer operations. The process reclassifies the unregistered load clustering data set into multi-dimensional planes based on the reference area, such as the active power, the reactive power, the time, or the like. The process sets a classification boundary surface in the same load apparatus through the machine running to distinguish the unregistered load clustering set for each specific operation or component such as "ON" or "OFF", multi-steps, continuous change, always-activation, or the like.

The distinguished data sets are mapped to the real-time power consumption change to complete the distinguishment and the lower components of the individual load apparatuses are grouped into the same load apparatus which may be recognized by the user (1+2+3 or A+B+C). Further, the registered data sets (refrigerator, washing machine, air-conditioner, or the like) of the individual load apparatuses are matched which have been already stored to be automatically labeled.

In this case, the load apparatuses which are not automatically labeled due to data which are present in the registered data sets are manually labeled through a means of checking the corresponding time by manually turning "ON" or "OFF" the load apparatuses which are not automatically labeled. In addition, the manually generated data are added to the pre-collected data set again and then used for the automatic labeling. Further, the various components of the energy measurement information labeling server 102 and operations thereof are described in conjunction with the FIG. 4

Referring to the FIG. 3, in an embodiment, the energy measurement information labeling server 102 can include a receiving unit 302, a recombining unit 304, and a labeling unit 306.

The receiving unit 302 can be configured to receive a data set generated by classifying power information based on individual load apparatuses. The recombining unit 304 can be configured to reclassify the received data set on a multidimensional plane according to operating characteristics of the individual load apparatuses. Further, the recombining unit 304 can be configured to map and recombine the reclassified data set according to a time domain.

Prior to this, the recombining unit 304 can be configured to decompress data. When the energy measuring apparatus 100 transmits the compressed data, the energy measuring apparatus 100 can cancel the data compression in order to increase the execution speed. When the compression is cancelled, the recombining unit 304 can be configured to map the reclassified data to a power consumption change in the time domain to recombine components in the same load apparatus.

The FIG. 3 illustrates a limited overview of the energy measurement information labeling server 102 but, it is to be understood that other embodiments are not limited thereto. The labels provided to each unit or component is only for illustrative purpose and does not limit the scope of the invention. Further, the one or more components can be combined or separated to perform the similar or substantially similar functionalities without departing from the scope of the invention. Furthermore, the energy measurement information labeling server 102 can include various other components interacting locally or remotely along with other hardware or software components to label the extracted energy usage information of a plurality of load apparatus connected to a power penetration point.

Figure 4:
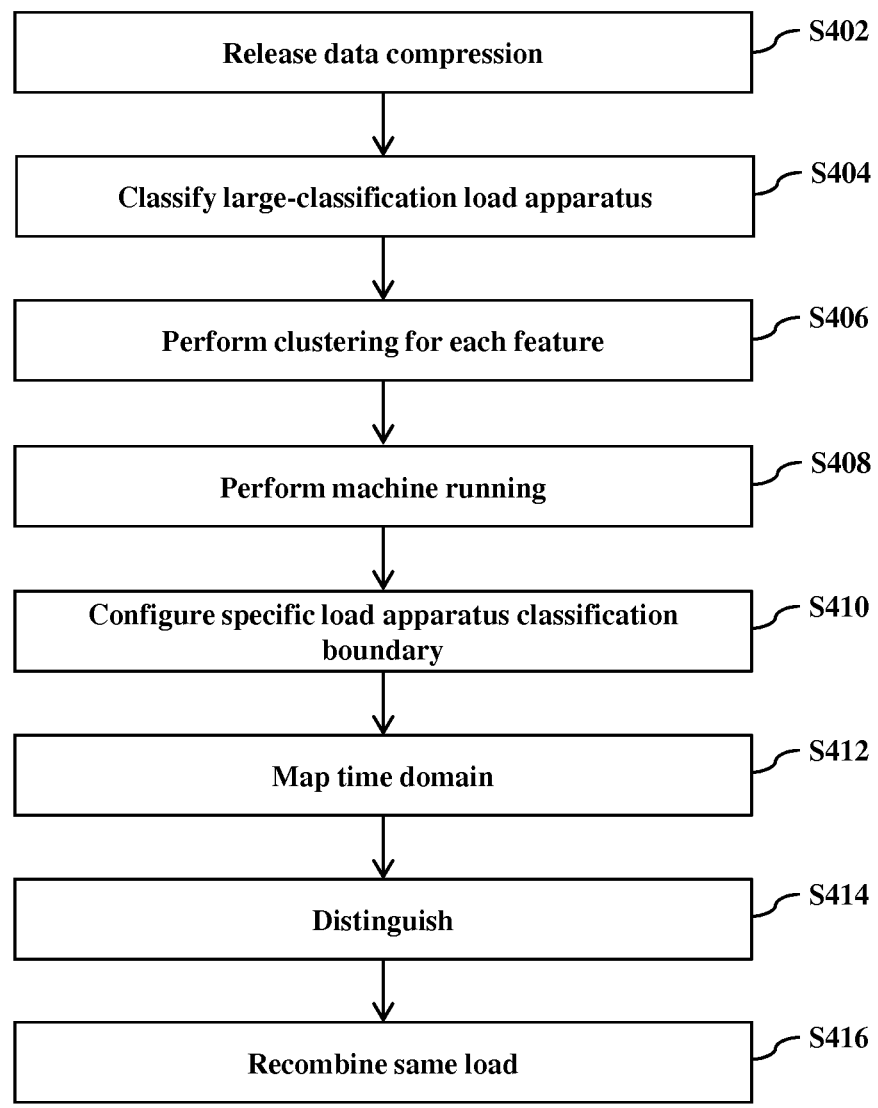
FIG. 4 is a flowchart illustrating various operations performed by the energy measurement information labeling server, according to the embodiments as described herein.

FIG. 4 is a flowchart illustrating various operations performed by the energy measurement information labeling server 102, according to the embodiments as described herein. In an embodiment, the recombining unit 304 can be configured to decompress data (Step S402). When the energy measuring apparatus 100 transmits the compressed data, the energy measuring apparatus 100 can cancel the data compression in order to increase the execution speed. The recombining unit 304 can be configured to classify large classification load apparatus (Step S404). A distribution plane is distinguished according to load operating characteristics ("ON" or "OFF", multi-steps, a continuous change, and always activation) for the individual load apparatuses determined as the same energy load apparatus.

Further, the recombining unit 304 can be configured to perform clustering of features (Step S406). The multi-dimensional plane is reconfigured so as to facilitate setting a boundary in the distribution plane by interlocking a clustering data set. In an embodiment, the active power, the reactive power, a time, or the like can be reference areas in reconfiguring the multi-dimensional plane.

When the multi-dimensional plane is reconfigured, the recombining unit 304 can be configured to perform machine learning (Step S408). The operations of the individual load apparatuses or an inter-component boundary classification reference is generated by using a clustering result for each load apparatus and a machine running method based on a status distinguishment technique such as an artificial intelligence network. In addition, the recombining unit 304 can be configured to set specific load apparatus classification boundary (Step S410). Data is reclassified by performing load distinguishment at an individual component level for clustering the data by using the machine running boundary classification reference. In this case, unregistered-scheme detailed load classification is determined up to component levels for the individual load apparatuses from a total electric energy.

Further, the recombining unit 304 can be configured to map time domain (Step S412). The data sets for unregistered components reclassified in the process are mapped to real-time data in the time domain. The recombining unit 304 can be configured to distinguish the mapped data (Step S414). The mapped data are distinguished at the component level by various colors or a display method which may be recognized by the user.

Furthermore, the recombining unit 304 can be configured to recombine the same load (Step S416). A group is generated with the load apparatus which may be recognized by the user by combining sub components in the individual load apparatuses generated in the distinguishing step. As one example, compressor, motor, lamp, and control circuit characteristics, generated in the distinguishing step, are combined to be grouped into a refrigerator.

After the recombination step, the labeling unit 306 can be configured to label the recombined data set. For example, a name of a corresponding load apparatus automatically matches unregistered temporary mark data classified as the individual load apparatuses in association with a prestored load apparatus data set. As one example, the A, B, C, or the like may be automatically registered as a refrigerator, a television, a washing machine, or the like through a data pattern and a matching technique with storage data.

Further, in the embodiment, labeling may be manually received. In spite of execution of automatic labeling, a developer or the user manually names apparatuses with respect to loads which are unregistered due to mismatching with prestored load apparatus data and inputs the names. A method that uses an "ON" or "OFF" time of the apparatus is also available.

Further, corresponding data is separately stored together with registration with respect to the individual load apparatuses in which the manual labeling is performed to extend a prestored load apparatus data set.

Furthermore, the energy measurement information labeling server 102 may provide data analysis information using energy usage information of the individual load apparatuses. The data analysis based on a behavioristic psychology analysis technique may be applied to total power and energy usage patterns of the individual load apparatuses to generate a specific data set.

Further, a specialist consulting tip to induce energy saving of the user may be automatically generated through the data analysis.

Moreover, an integrated service is available, which provides the total electric energy, usages of the individual load apparatuses, energy saving consulting, or the like to a specific building and a unit household through an energy IT special provider.

Example of various energy saving consulting can be, when a change of the clustering data set distinguished at the component level is sensed in association with the statuses of the individual load apparatuses to determine component aging statuses or failure statuses of the individual load apparatuses, to provide the determined component aging statuses or failure statuses to the user.

According to the embodiments, the hardware of the meter and the software techniques of the server are combined to extract energy usage information of individual components of various load apparatuses from total energy usage information at the power penetration point.

Further, since the software technique of the server is flexibly combined with the single energy measuring apparatus, detailed and accurate energy usage information of the individual load apparatuses is extracted without large cost for system installation through multiple apparatuses to derive a high-end energy saving scheme. In particular, it is possible to acquire energy usage information higher than a branch circuit level without adopting multiple sensors in the distribution board.

In summary, in the present invention, in extracting the energy usage information of the individual load apparatuses in the total electric energy consumption measured at the power penetration point, a specific server does not perform all techniques. Unlike the conventional mechanisms, the previous information processing is performed so as to have resolution which may be distinguished for each component in the single energy measuring apparatus and the server concentratively performs data storage, pattern analysis, and data utilization as an advantage thereof to secure flexibility in energy usage associated mass data processing, storing, or management of various loads.

The various actions, acts, blocks, steps, or the like of the FIG. 4 may be performed in the order presented, in a different order or simultaneously. Further, in some embodiments, some of the actions, acts, blocks, steps, or the like may be omitted, added, modified, skipped, or the like without departing from the scope of the invention.

Referring to FIGS. 7 to 10, registration of the load apparatus using a multi-tap type energy measuring apparatus will be described.

In an embodiment, the energy measuring apparatus described herein is implemented as the multi-tap type having a different shape from the aforementioned energy measuring apparatus 100 (provided in the distribution board), but both apparatuses are the same as each other in terms of components for performing an energy measuring operation and operations thereof. However, both apparatuses may be different from each other in terms of some energy measuring operations or some components according to a difference in shape.

A power managing server to be described below may be the same as the aforementioned labeling server 102, but may further include a constituent element or a function compared to the labeling server 102 in order to register a load apparatus to be described below. Alternatively, the power managing server may be a server which is provided separately from the aforementioned labeling server in order to register a load apparatus to be described below.

Figure 5:
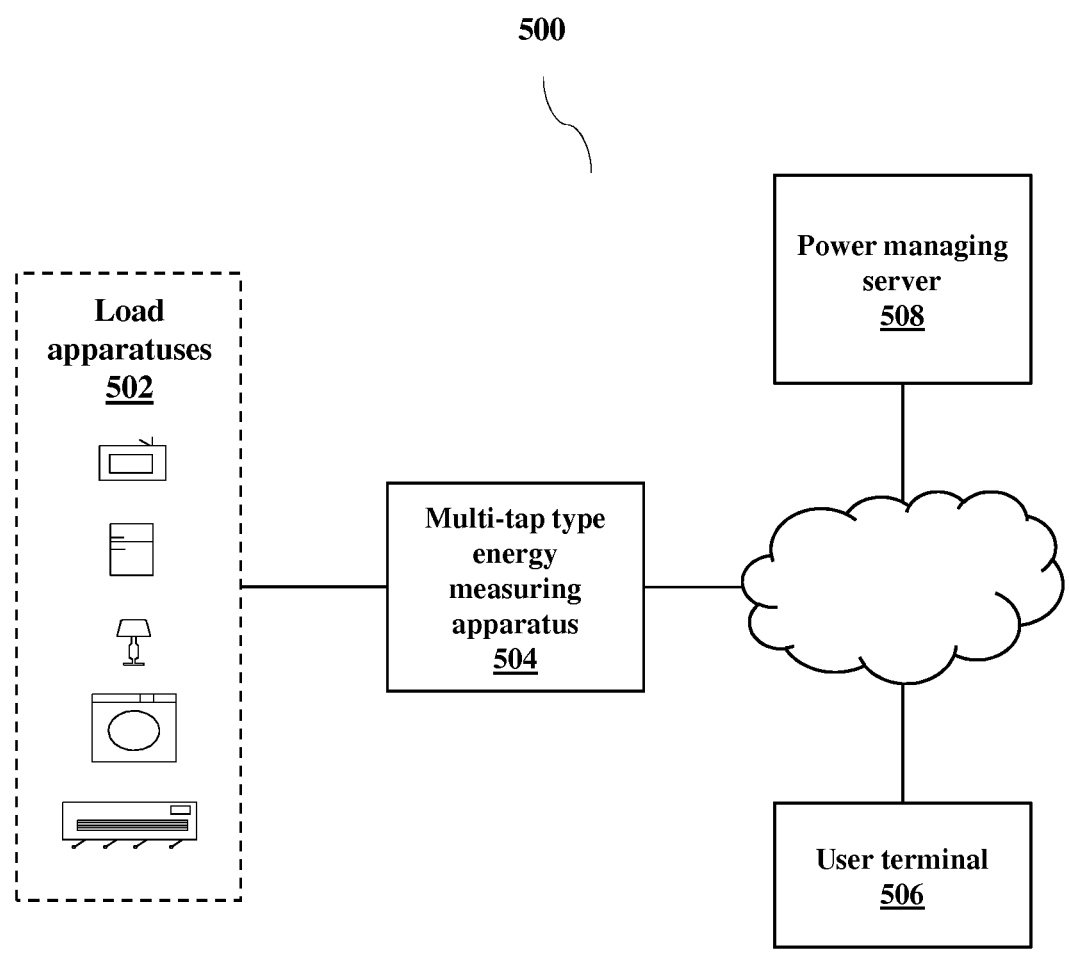
FIG. 5 is a configuration diagram of a system for power management, according to the embodiments as described herein.

FIG. 5 is a block diagram of a system 500 (hereinafter referred as a power managing system) for power management, according to an embodiment as described herein. In an embodiment, the power managing system 500 includes at least one load apparatus 502, a multi-tap type energy measuring apparatus 504 measuring energy use information of the connected load apparatuses 502, a user terminal 506 receiving a scan command and apparatus information for the connected load apparatuses 502, and a power managing server 508 determining a power consumption pattern of the connected load apparatuses 502 for a predetermined time in response to the scan command and registering the connected load apparatuses 502 based on the determined power consumption pattern and the received apparatus information.

Constituent elements of the power managing system 500 may further include a relay device or AP (not illustrated) which supports communication through a homogenous or heterogeneous network and for smooth communication. For example, the communication through the network may include all of wired or wireless communication.

The load apparatus 502, as an electronic apparatus consuming power and operating, may include an electronic product such as a refrigerator, a TV, an air conditioner, a computer, and a washing machine, or the like.

The multi-tap type energy measuring apparatus 504 may be connected with one or more load apparatuses 502 through at least one outlet, and supply power to the connected load apparatuses 502 and acquire energy use information therefrom. Further, the multi-tap type energy measuring apparatus 504 may include a communication unit (not illustrated) supporting a communication function with the user terminal 506 or the power managing server 508 to transmit the energy use information for the load apparatuses 502 to the user terminal 506 or the power managing server 508.

The configuration of the multi-tap type energy measuring apparatus 504 will be described below in detail with reference to the FIG. 6.

The user terminal 506 may receive the scan command and the apparatus information for the connected load apparatuses 502 from the user by using a power managing application. Alternatively, the user terminal 506 may receive the scan command and the apparatus information for all, some, or each of the load apparatuses 502 when the plurality of load apparatuses are connected to the multi-tap type energy measuring apparatus 504.

Here, the user terminal 506 means a device comprising an application as a bidirectional communicable apparatus with an external apparatus or server. Examples of the user terminal 506 may be a smart phone, a tablet PC, a notebook, or the like. Further, the apparatus information may include information on at least one of a manufacturer, a product type, a product model name, a product version, a product operation, or the like.

The configuration of the user terminal 506 will be described below in detail with reference to the FIG. 8.

The power managing server 508 can be configured to determine a power consumption pattern of the connected load apparatuses 502 for a predetermined time in response to the scan command. The power managing server 508 can be configured to register the connected load apparatuses 502 based on the determined power consumption pattern and the received apparatus information. Further, the power managing server 508 may transmit registration information of the load apparatuses 502 or power use information for the load apparatuses 502 to the user terminal 506. Furthermore, the power managing server 508 may grant predetermined compensation for the registration of the load apparatuses 502 and transmit information on the granted compensation to the user terminal 506.

The FIG. 5 illustrates a limited overview of the power managing system 500 but, it is to be understood that other embodiments are not limited thereto. The labels provided to each unit or component is only for illustrative purpose and does not limit the scope of the invention. Further, the one or more units can be combined or separated to perform the similar or substantially similar functionalities without departing from the scope of the invention. Furthermore, the power managing system 500 can include various other units or components interacting locally or remotely along with other hardware or software components to register a load apparatus in a power managing server to manage power usage by the registered load apparatus.

Figure 6:
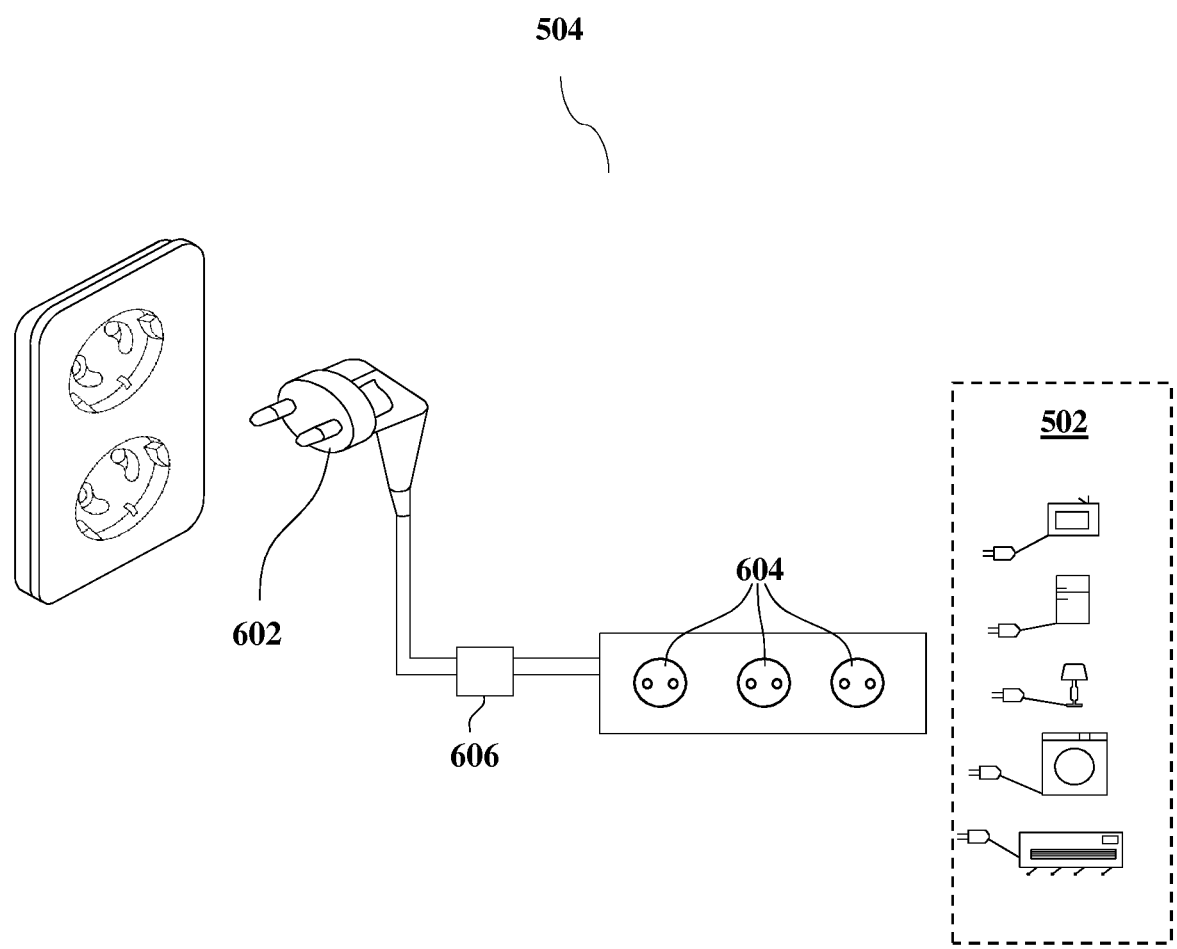
FIG. 6 illustrates a multi-tab type energy measuring apparatus, according to the embodiments as described herein.

FIG. 6 illustrates a multi-tab type energy measuring apparatus 504 according to an embodiment of the present invention. In an embodiment, the multi-tap type energy measuring apparatus 504 may include a plug 602 for being connected to a multi tab to which a fixed outlet provided on a wall side or a power supply is connected. An outlet 604 for being coupled with a plug of the load apparatus 502, and an energy measuring unit 606 measuring energy use information for the connected load apparatuses 502.

In an embodiment, the multi-tap type energy measuring apparatus 504 may receive power from a distribution board by connecting the plug 602 to another multi tab to which the fixed outlet or the power supply is connected. For example, the multi-tap type energy measuring apparatus 504 may be freely connected to an outlet at a desired position of the user in the case where a plurality of other multi tabs to which the fixed outlet or the power supply is connected indoors is provided.

The multi-tap type energy measuring apparatus 504 includes a plurality of outlets 604 which is connected with a plug of each of the plurality of load apparatuses 502. When the plug of the load apparatus 502 and the outlet 604 are coupled with each other, the multi-tap type energy measuring apparatus 504 may be connected with the corresponding load apparatus.

The multi-tap type energy measuring apparatus 504 may include an energy measuring unit 606 between the plug 602 and the outlet 604. For example, the energy measuring unit 606 may be disposed to contact the outside of a case protecting the outlet 604 or inside the case protecting the outlet 604.

Furthermore, although not illustrated in the FIG. 6, the multi-tap type energy measuring apparatus 504 can include a switch (hereinafter referred as the entire switch) for the entire outlet. The entire switch may supply or interrupt the power to the entire load apparatuses 502 connected to each other through "ON" or "OFF" operations in order to activate or deactivate an energy measuring operation for the entire load apparatuses 502. Alternatively, the multi-tap type energy measuring apparatus 504 can include a switch (hereinafter referred as an individual switch) for an individual outlet. The individual switch may supply or interrupt the power to a corresponding load apparatus 502 connected to each other through "ON" or "OFF" in order to activate or deactivate an energy measuring operation for the corresponding load apparatus 502.

Figure 7:
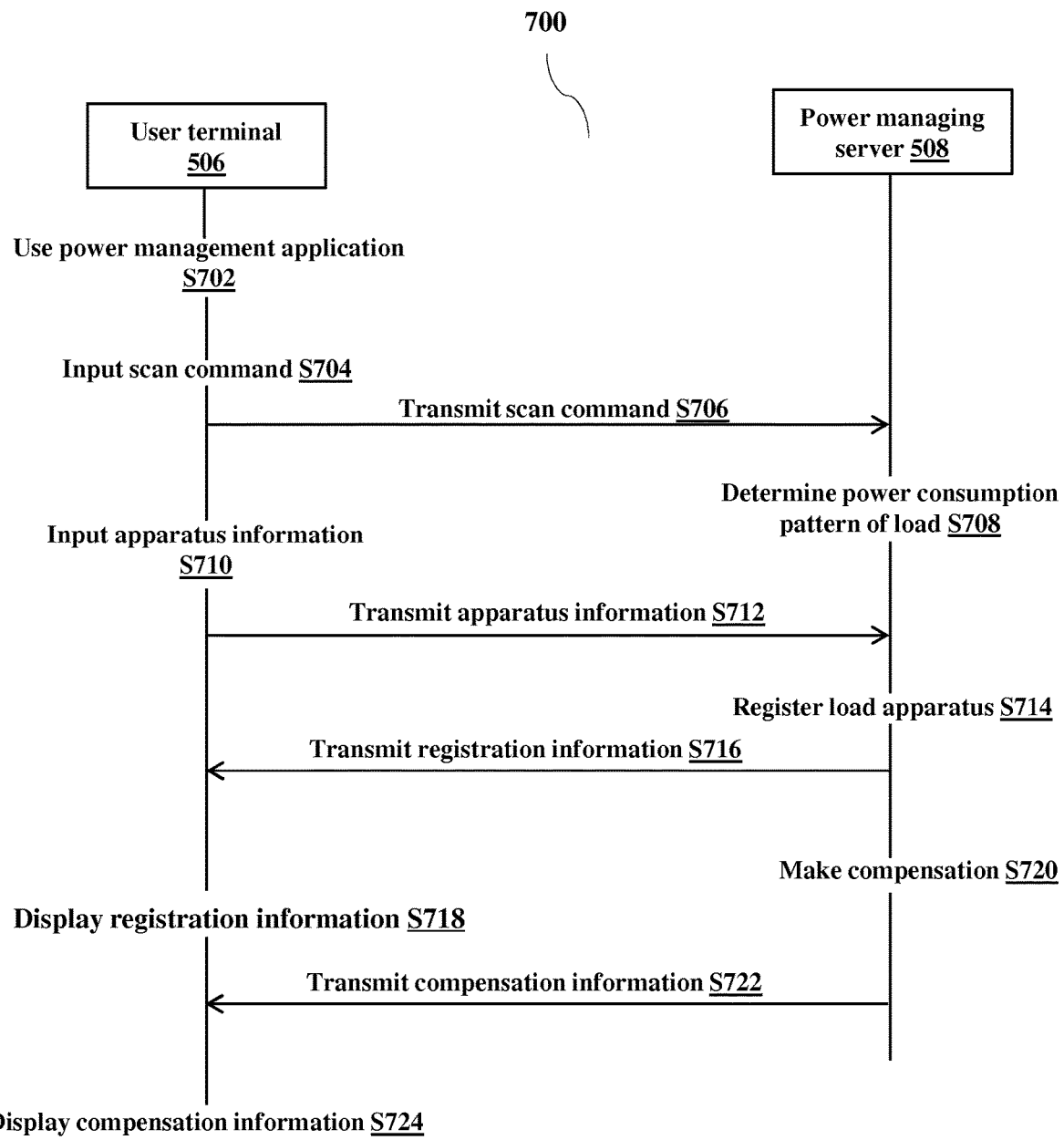
FIG. 7 is a sequence diagram illustrating various operations for managing power, according to the embodiments as described herein.

FIG. 7 is a sequence diagram illustrating various operations 700 performed for power management, according to an embodiment described herein. In an embodiment, the user terminal 506 can be configured to use a power managing application (S702).

The user terminal 506 may initiates the power managing application according to a predetermined period, when an execution command is received from the user and a predetermined event occurs. Some examples of the predetermined event can include excessive power consumption of a predetermined load apparatus, interruption of the energy measuring operation, and reception from the power use or consumption-related information.

In an embodiment, the operations of the user terminal 506 may be performed by the power managing application.

The user terminal 506 receives the scan command for the load apparatuses 502 connected to the multi-tap type energy measuring apparatus 504 (S704).

The user terminal 506 may receive the scan command for the entire load apparatuses 502 or an individual load apparatus when the plurality of load apparatuses is connected to the multi-tap type energy measuring apparatus 504. Alternatively, the user terminal 506 may receive the scan command for one connected load apparatus when one load apparatus is connected to the multi-tap type energy measuring apparatus 504. Further, the user terminal 506 transmits a signal (hereinafter referred as a scan command signal) corresponding to the received scan command to the power managing server 508 (S706). For example, the scan command signal may include identification information of a user terminal, input time information of the scan command, or the like.

Further, the power managing server 508 can be configured to determine the power consumption pattern of the load apparatus 502 which is connected to the multi-tap type energy measuring apparatus 504 for a predetermined time by receiving the scan command signal from the user terminal 506 (S708).

For example, the power managing server 508 may identify the corresponding user terminal by using the identification information of the user terminal. The power managing server 508 may identify the energy measuring apparatus 100 corresponding to the identified user terminal by using the information on the energy measuring apparatus 100 associated with each pre-stored user terminal. Accordingly, the power managing server 508 may determine the power consumption pattern of the load apparatus 502 connected to the identified energy measuring apparatus 100.

Further, the power managing server 508 may scan the load apparatus 502 connected to the multi-tap type energy measuring apparatus 504 for a predetermined time, from a receiving timing of the scan command signal, to determine the power consumption pattern of the load apparatus 502. Furthermore, the power managing server 508 may determine the power consumption pattern by using an average power consumption value acquired by scanning for a predetermined time or determine the power consumption pattern repeated at the predetermined number of times.

Further, the power managing server 508 may determine the power consumption pattern for each of the plurality of load apparatuses 502 when the plurality of load apparatuses 502 is connected to the multi-tap type energy measuring apparatus 504.

The user terminal 506 receives apparatus information on the load apparatuses 502 connected to the multi-tap type energy measuring apparatus 504 from the user (S710). The user terminal 506 may receive the apparatus information before or after inputting of the scan command or after the scan completion.

Particularly, in the case of the apparatus information input after the scan completion, the user terminal 506 may receive information on the power consumption pattern acquired as the scan completion result from the power managing server 508 and provide the received power consumption pattern to the user. Accordingly, the user may input apparatus information on the load apparatus 502 corresponding to the provided power consumption pattern.

The user terminal 506 transmits the inputted apparatus information to the power managing server 508 (S712). For example, the apparatus information may include information on a manufacturer, a product type, a product name, a model name, a product version, or the like of the corresponding load apparatus.

The power managing server 508 registers the load apparatus 502 based on the power consumption pattern determined in the determining step (S708) and the apparatus information received in the transmitting steps (S712) and (S714).

The power managing server 508 may register the load apparatus 502 for each user terminal and store registration information on the registered load apparatus 502. For example, the registration information may include the apparatus information of the manufacturer, the product type, the product name, the model name, the product version, or the like of the corresponding load apparatus 502 to include the power consumption pattern of the corresponding load apparatus.

Here, the registration information may be updated (For example, edited, added, or deleted) at any time or periodically. For example, the apparatus information may be updated when additional apparatus information is received from the user or when the apparatus information is updated by the manufacturer. Further, the power consumption pattern may be updated when the scan command is re-received from the user or when the power managing server 508 determines that the update is required.

The power managing server 508 transmits information (hereinafter referred as registration information) on registration of the load apparatus 502 to the user terminal 506 (S716), and the user terminal 506 displays the registration information received in the transmitting steps (S716) and (S718).

Furthermore, the power managing server 508 grants the predetermined compensation for the registration of the load apparatus (S720), and transmits information (hereinafter referred as compensation information) on the granted compensation to the user terminal 506 (S722). In addition, the user terminal 506 displays the compensation information received in the transmitting steps (S722) and (S724).

For example, the compensation information provided to the user with respect to the registration of the load apparatus 502 may include information on discount of power use fee, points available to the payment of the power use fee, or the like. Further, the power managing server 508 may grant the compensation in proportion to the number of registered load apparatuses 502.

FIG. 8 is a block diagram of the user terminal 506 having a power managing function, according to the embodiments described herein. In an embodiment, the user terminal 506 includes a control unit 802 comprising the power managing application, an input unit 804 receiving the scan command and the apparatus information for the load apparatus 502 connected to the multi-tab type energy measuring apparatus 504 using the power managing application, a storing unit 806 storing the power managing application, a communication unit 808 transmitting a signal corresponding to the scan command and the apparatus information to the power managing server 508, and an output unit 810 displaying a screen of the power managing application.

In an embodiment, the control unit 802 may control at least one operation of the input unit 804, the storing unit 806, the communication unit 808, and the output unit 810. The control unit 802 may use the power managing application in the case of receiving the execution command from the user through the input unit 804. Furthermore, the control unit 802 may uses the power managing application in the case of receiving a signal for a predetermined event from the power managing server 508.

The input unit 804 receives the scan command for the load apparatus 502 connected to the multi-tap type energy measuring apparatus 504 from the user. Further, the input unit 804 may receive the scan command for the entire load apparatuses or an individual load apparatus when the plurality of load apparatuses 502 is connected to the multi-tap type energy measuring apparatus 504.

Some non-limiting examples of the input unit 804 may include a touch screen, a button, a voice input unit, or a motion input unit. The scan command may be input through a touch for a scan command icon/text. A voice may correspond to the scan command. Likewise, a motion may correspond to the scan command.

The communication unit 808 may transmit the scan command signal to the power managing server 508 and receive the power consumption pattern from the power managing server 508 according to the scan result. Furthermore, the output unit 810 may display the received power consumption pattern.

The input unit 804 receives the apparatus information on the load apparatus 502 connected to the multi-tap type energy measuring apparatus 504 from the user, and the communication unit 808 transmits the inputted apparatus information to the power managing server 508.

Further, the input unit 804 may receive the apparatus information before or after inputting of the scan command or after completion of the scan. For example, the input unit 804 may input the apparatus information on the load apparatus 502 corresponding to the power consumption pattern displayed through the output unit 810.

Accordingly, the power managing server 508 may register the load apparatus 502 based on the power consumption pattern and the apparatus information and store the registration information on the registered load apparatus.

The storage unit 806 may store the power managing application and store the registration information on the load apparatus 502 registered in the power managing server 508 by the user terminal 506. Furthermore, the storage unit 806 may also store compensation information provided from the power managing server 508 or the power use information.

Further, the communication unit 808 may receive registration information of the load apparatus 502, compensation information on the registration of the load apparatus 502, or power use information on the load apparatus 502 from the power managing server 508.

Accordingly, the output unit 810 may display the received registration information, compensation information, or power use information. For example, the registration information may include the apparatus information and the power use pattern.

The compensation information may include information on a discount of power use fee, points available to the payment of the power use fee, or the like. The power use information may include guide information for power consumption, a maximum power consumption time zone, guide information for power consumption reduction of the registered load apparatus, or the like.

The FIG. 8 illustrates a limited overview of user terminal 506 but, it is to be understood that other embodiments are not limited thereto. The labels provided to each unit or component is only for illustrative purpose and does not limit the scope of the invention. Further, the one or more units can be combined or separated to perform the similar or substantially similar functionalities without departing from the scope of the invention. Furthermore, the user terminal 506 can include various other units or components interacting locally or remotely along with other hardware or software components to register a load apparatus in a power managing server to manage power usage by the registered load apparatus.

Figure 9A:
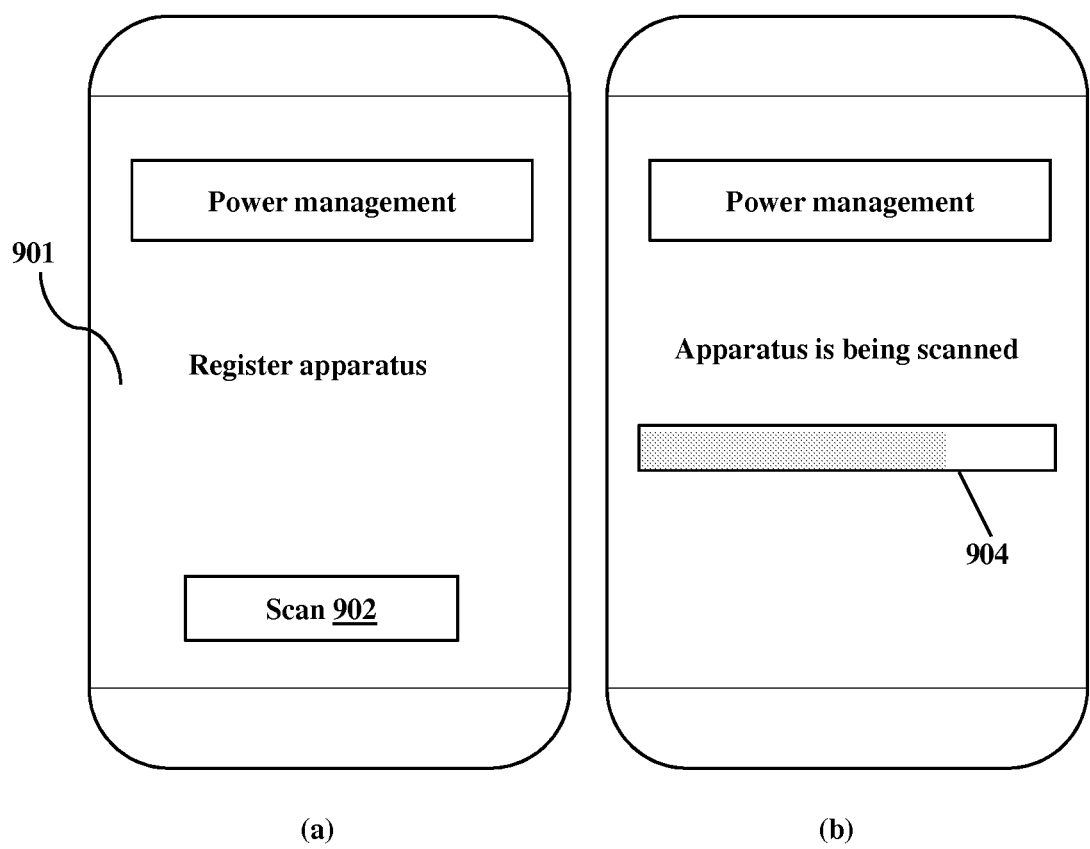
FIGS. 9A and 9B illustrate a scan command input screen on the user terminal, according to the embodiments as described herein.
Figure 9B:
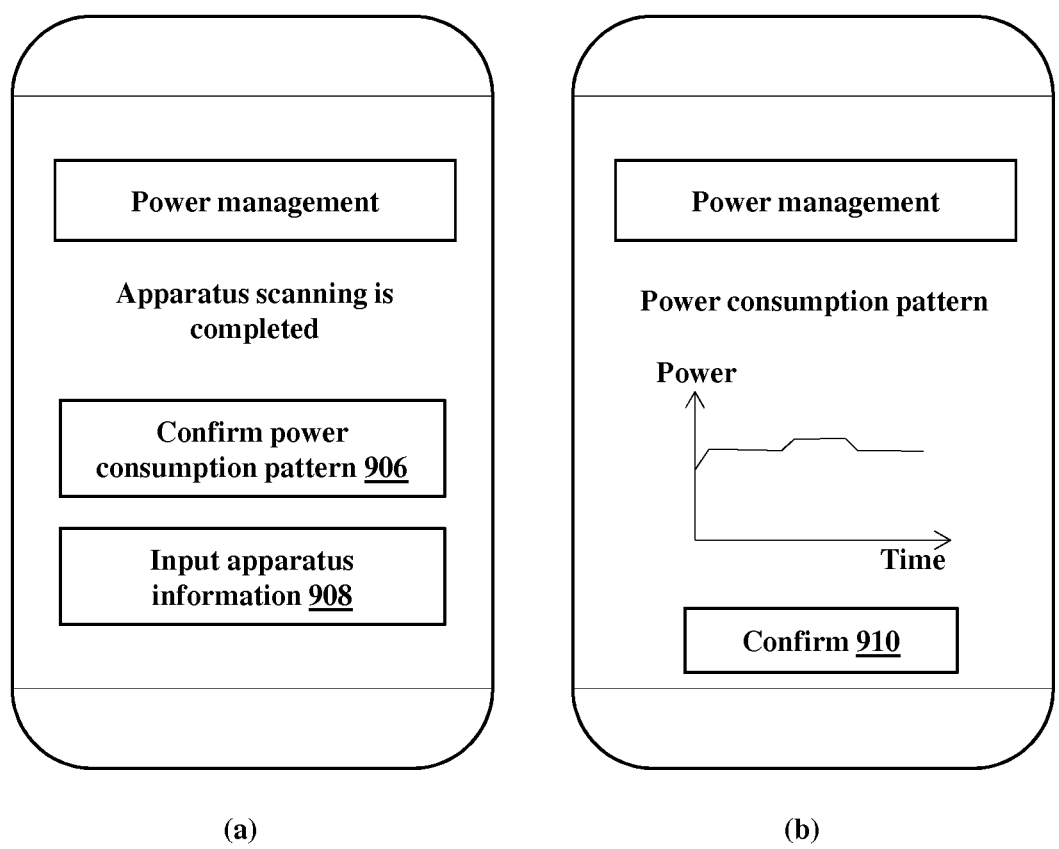

FIGS. 9A and 9B illustrate a scan command input screen on the user terminal, according to the embodiments as described herein. In an embodiment, the user terminal may display a screen (hereinafter referred as a registration screen) for registering the load apparatus using the power managing application.

As shown in the FIG. 9A, the user terminal may display a registration screen including an area 901 for inputting the scan command (a), and display currently-scanning by performing a scan operation by the power managing server in order to determine the power consumption pattern of the load apparatus when the area 902 is selected by the user (b). Furthermore, the user terminal may display a progressing degree of the scan operation by using a progressing bar 904.

Further, in an embodiment, the user terminal may display a screen (hereinafter referred as a completion alarm screen) alarming the scan completion when the scanning for the load apparatus is completed.

As shown in the FIG. 9B, the user terminal may display a completion alarm screen including an area 906 for receiving a confirm command for the power consumption pattern acquired as the scan completion result, and an area 908 for selecting the apparatus information input for the scanned load apparatus (a). When the area 906 is selected by the user, the user terminal may display the power consumption pattern of the corresponding load apparatus (b). Furthermore, in (b), when the confirm area 910 is selected, the screen may be converted into the state (a) or a screen for inputting the apparatus information.

Figure 10A:
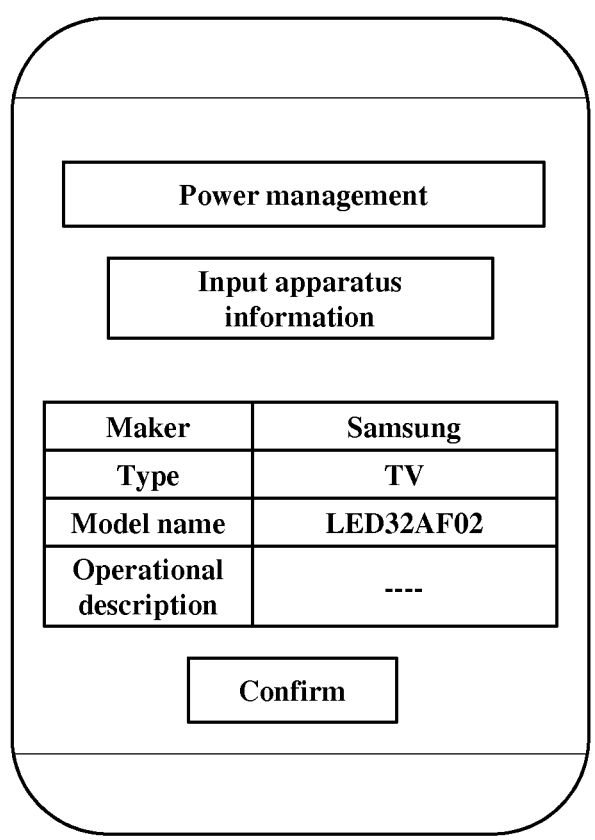
FIGS. 10A and 10B illustrate an apparatus information input screen on the user terminal, according to the embodiments as described herein.
Figure 10B:
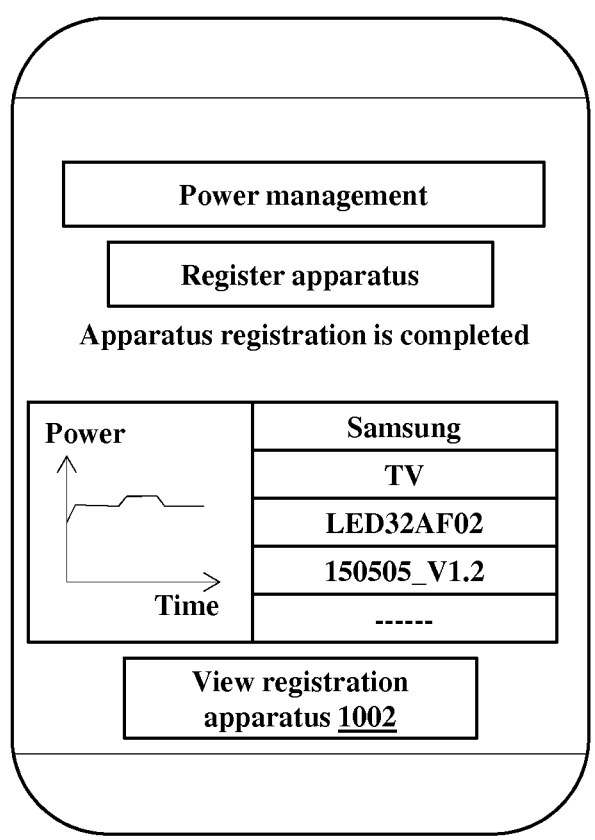

FIGS. 10A and 10B illustrate an apparatus information input screen on the user terminal according to the embodiments as described herein. In an embodiment, as shown in the FIG. 10A, the user terminal may display a screen (hereinafter referred as an input screen) for inputting apparatus information on the load apparatus using the power management application. Furthermore, the user terminal may display the input screen as the area 908 is selected in the FIG. 10B (a). Accordingly, the user may input or select the apparatus information on the load apparatus connected to the multi-tap type energy measuring apparatus through the input screen. For example, the apparatus information (e.g., a maker list, a product type list, a model name list, or the like) are shown to the user.

As shown in the FIG. 10B, when the user terminal may receive the registration information from the power managing server 508, the user terminal may display the received registration information. For example, the registration information, the power consumption pattern of the corresponding load apparatus 502, and the apparatus information of the corresponding load apparatus 502 may be displayed on the user terminal.

Further, the user terminal may display registration information on all load apparatuses 502 registered by the power managing server 508 when a registration apparatus view area 1002 is selected.

As the embodiment of the present invention, by granting specific recognition codes (a QR code, and the like) to products installed in products installed in a home appliance store and connecting the recognition codes to the multi-tap type energy measuring apparatus 504, a consumer who visits the store may immediately query real-time energy consumption and a consumption record of the home appliance which the consumer intends to purchase by using a smart phone and associated applications.

The FIGS. 9A to 10B shows example screens described only for illustrative purpose and does not limit the scope of the invention. It is to be understood that other embodiments are not limited thereto. Contents given above just exemplify a principle of the invention. Therefore, those skilled in the art may invent various devices that implement the principle of the present invention and are included in the concept and the scope of the present invention even though not clearly described or illustrated in the present specification. Further, it should be appreciated that all conditional terms and embodiments enumerated in the specification are apparently intended only for the purpose of appreciating the concept of the present invention in principle and are not limited to particularly enumerated embodiments and states as described above.

The embodiments disclosed herein can be implemented through at least one software program running on at least one hardware device and performing network management functions to control the elements. The figures include blocks which can be at least one of a hardware component or a combination of hardware device and software components.

The foregoing description of the specific embodiments will so fully reveal the general nature of the embodiments herein that others can, by applying current knowledge, readily modify or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the technical spirit and scope of the embodiments as described herein.

What is claimed is:

1. A system for power management, the system comprising:
a multi-tap type energy measuring apparatus including:
a plurality of outlets; and
circuitry configured to:
measure energy usage information of a plurality of load apparatuses connected to the circuitry through the plurality of outlets, the energy usage information including a power signal having an active power and a reactive power of the plurality of load apparatuses;
extract snapshots from sampling of the power signal; and
extract a reference point and an operating status including an "ON" status or an "OFF" status determined by the reference point and the snapshots;
a power managing application program executing in a user terminal associated with a user wherein the power managing application program provides an input screen in a display of the user terminal in which the user inputs a scan command for an individual load apparatus and device information of the individual load apparatus; and
a power managing server performing a scan operation to determine a power consumption pattern of the individual load apparatus of the plurality of load apparatuses for a predetermined time based on the snapshots extracted from sampling of the power signal measured by the multi-tap type energy measuring apparatus for the predetermined time in response to receiving said scan command sent by the user terminal, and registering at least one load apparatus based on said determined power consumption pattern and the input device information of said at least one load apparatus.

2. The system of claim 1, wherein the device information of the plurality of load apparatuses includes information on at least one of a maker, a product type, a product model name, a product version, and a product operation.

3. The system of claim 1, wherein said power managing server is further configured to transmit information on registration of the individual load apparatus to said user terminal.

4. The system of claim 1, wherein said power managing server is configured to make a predetermined compensation for said registration of the individual load apparatus.

5. The system of claim 1, wherein the snapshots are extracted by collecting a voltage or current snapshot of an alternating current waveform having a predetermined cycle.

6. A power managing method for a plurality of load apparatuses connected to a multi-tap type energy measuring apparatus through a plurality of outlets, the method comprising:
measuring energy usage information of a plurality of load apparatuses, the energy usage information including a power signal having an active power and a reactive power of the plurality of load apparatuses, wherein the measuring of the energy usage information includes extracting snapshots from sampling of the power signal, and wherein the measuring of the energy usage information further includes extracting a reference point and an operating status including an "ON" status or an "OFF" status determined by the reference point and the snapshots;
receiving, by a user terminal associated with a user, a scan command for an individual load apparatus of the plurality of load apparatuses and a device information of the individual load apparatus of the plurality of load apparatuses;
performing a scan operation, by a power managing server, to determine a power consumption pattern of said individual load apparatus of the plurality of load apparatuses for a predetermined time based on the snapshots extracted from sampling of the power signal measured by the multi-tap energy measuring apparatus for a predetermined time in response to a signal corresponding to said scan command from said user terminal;
receiving, by said user terminal, the device information of said load apparatus; and
registering, by said power managing server, said individual load apparatus based on said determined power consumption pattern and said device information of said individual load apparatus received from said user terminal.

7. The method of claim 6, wherein said scan command and said device information of said load apparatus are received by said user terminal using a power management application.

8. The method of claim 6, further comprising:
transmitting, by said power managing server, information on said registration of said load apparatus to said user terminal; and
making, by said power managing server, a predetermined compensation for said registration of said load apparatus.

9. The method of claim 6, wherein the snapshots are extracted by collecting a voltage or current snapshot of an alternating current waveform having a predetermined cycle.

10. A system for power management, the system comprising:
a multi-tap type energy measuring apparatus, connected to at least one load apparatus, configured to measure energy usage information of said at least one load apparatus wherein the energy usage information includes a power signal, extract snapshots from sampling of the power signal, and extract a reference point and an operating status including an "ON" status or an "OFF" status determined by the reference point and the snapshots;
a user terminal associated with a user and configured to receive a scan command and information of said at least one load apparatus; and
a power managing server configured to determine a power consumption pattern of said at least one load apparatus for a predetermined time in response to receiving said scan command, to register said at least one load apparatus based on said determined power consumption pattern and said information of said at least one load apparatus, and to grant a predetermined compensation to the user for said registration of said at least one load apparatus.

11. The system of claim 10, wherein the snapshots are extracted by collecting a voltage or current snapshot of an alternating current waveform having a predetermined cycle.

* * * * *